US006702329B1

(12) United States Patent
Nishio

(10) Patent No.: US 6,702,329 B1
(45) Date of Patent: Mar. 9, 2004

(54) INTEGRALLY MOLDED FENDER COVER AND STEP FOR INDUSTRIAL VEHICLES

(75) Inventor: Jun Nishio, Kariya (JP)

(73) Assignee: Kabushiki Kaisha Toyoda Jidoshokki Seisakusho, Kariya (JP)

( * ) Notice: Subject to any disclaimer, the term of this patent is extended or adjusted under 35 U.S.C. 154(b) by 0 days.

(21) Appl. No.: 09/625,632

(22) Filed: Jul. 26, 2000

(30) Foreign Application Priority Data

Jul. 29, 1999 (JP) .......................................... 11-215051

(51) Int. Cl.[7] ............................ B62D 25/22; B60R 3/00

(52) U.S. Cl. ........................ 280/849; 280/851; 280/163

(58) Field of Search .............................. 280/163, 164.1, 280/770, 847, 848, 849, 850, 851, 169, 159, 160

(56) References Cited

U.S. PATENT DOCUMENTS 1,863,475 A * 6/1932 Fox ............................ 280/848
1,896,797 A * 2/1933 Leamy ....................... 280/169
2,133,982 A 10/1938 Galwey
4,266,792 A 5/1981 Sanders et al.
4,750,752 A * 6/1988 Furuta ........................ 280/169
5,367,864 A 11/1994 Ogasawara et al. .......... 56/15.8
5,816,616 A * 10/1998 Boyd ......................... 280/847
6,016,943 A * 1/2000 Johnson et al. ............. 224/401
6,270,106 B1 * 8/2001 Maki et al. ................. 280/163

FOREIGN PATENT DOCUMENTS

JP 60-124577 3/1985
JP 656055 A * 3/1994 ........... B62D/25/22
JP 6-156148 6/1994
JP 7-187589 7/1995
JP 969822 12/1996
JP 10-024864 1/1998
JP 10-191728 A 7/1998 ........... A01C/11/02

OTHER PUBLICATIONS

DE–Z Plasterverarbeiter, (39) 1988, issue 6, p. 114, image 5.

* cited by examiner

*Primary Examiner*—Paul N. Dickson
*Assistant Examiner*—Joselynn Sliteris
(74) *Attorney, Agent, or Firm*—Morgan & Finnegan, LLP

(57) ABSTRACT

A fender cover is mounted on a fender of an industrial vehicle. A step is attached to a side of the vehicle body to be located rearward relative to the fender cover. The fender cover and the step are made of resin and shaped as one body through molding. The step includes a floor panel and a side wall. The fender cover is integrated with a front edge of the floor panel. The side wall is integrated with an inner edge and rear edge of the floor panel. The floor panel is open to the side of the vehicle body through its outer edge. The integrally molded fender cover and step prevent foreign objects from entering a space below the step and are easily installed in the vehicle body.

11 Claims, 6 Drawing Sheets

43
51
511
511
5
52
521
22
112
311
32
411
2
412
312
41
413
313
314
113
31
3
114
1

INTEGRALLY MOLDED FENDER COVER AND STEP FOR INDUSTRIAL VEHICLES

BACKGROUND OF THE INVENTION

The present invention relates to integrally molded fender covers and steps that are preferably used in industrial vehicles such as forklifts.

An industrial vehicle such as a forklift includes a step on which the operator steps when mounting and leaving the vehicle. The step is provided at one side of the vehicle's body frame. As shown in FIG. 6, a typical forklift has a step 9 located rearward relative to a fender 41 that extends above a corresponding front wheel (not shown). A fender cover 8 is mounted on the fender 41.

The step 9 includes a floor panel 91 and a side wall 92. The floor panel 91 has an inner edge 911 located inward from the exterior of the forklift 4 and a rear edge 912 located rearward in the forklift proceeding direction. The side wall 92 extends along the inner edge 911 and the rear edge 912 and projects upward from the floor panel 91. For securing the step 9 to the body frame, a front portion 913 of the step 9 opposed to the rear edge 912 is fitted to a bottom 81 of the fender cover 8 secured to the fender 41. Furthermore, a front end 922 of the side wall 92 that faces the fender cover 8 is fitted to a rear side 82 of the fender cover 8 facing rearward in the forklift proceeding direction. In this state, the step 9 is securely fixed to the fender cover 8. A pillar cover 5 extends from top of the fender cover 8 and encompasses a pillar 43 projecting upward from the fender 41. The pillar 43 supports a head guard (not shown) that extends above the operator seat.

Since the step 9 is separate from the fender cover 8, a coupling portion 99 extends between the front portion 913 of the floor panel 91 and the bottom 81 of the fender cover 8 and between the front end 922 of the side wall 92 and the rear side 82 of the fender cover 8. This coupling portion 99 enables foreign objects such as rain water or dust on the step 9 to enter a space below the step 9. No electric devices including motors and controllers are thus allowed in the space below the step 9. That is, this space is not efficiently used.

Furthermore, since the step 9 must be shaped to match the fender cover 8 and the fender 41, designing of the step 9 is complicated. In addition, the step 9 must be positioned accurately with respect to the fender cover 8 when securing the step 9 to the body frame. This lowers the work efficiency.

SUMMARY OF THE INVENTION

Accordingly, it is an objective of the present invention to provide a fender cover and a step that are formed as one body through molding for preventing foreign objects from entering a space below the step and for simplifying installation of the fender cover and step in a body frame.

To achieve the above objective, the present invention provides a molded body used in an industrial vehicle. The molded body includes a fender cover and a step. The fender cover and the step are integrated.

The present invention also provides an industrial vehicle including a fender cover mounted on a fender of the vehicle and a step located at a side of the vehicle body to be located rearward relative to the fender cover. The step is integrated with the fender cover.

Other aspects and advantages of the invention will become apparent from the following description, taken in conjunction with the accompanying drawings, illustrating by way of example the principles of the invention.

BRIEF DESCRIPTION OF THE DRAWINGS

The features of the present invention that are believed to be novel are set forthwith particularity in the appended claims. The invention, together with objects and advantages thereof, may best be understood by reference to the following description of the presently preferred embodiments together with the accompanying drawings in which:

FIG. 3(*b*) is a side view showing the step and fender cover of FIG. 1;

DETAILED DESCRIPTION OF THE PREFERRED EMBODIMENTS

Figure 6:
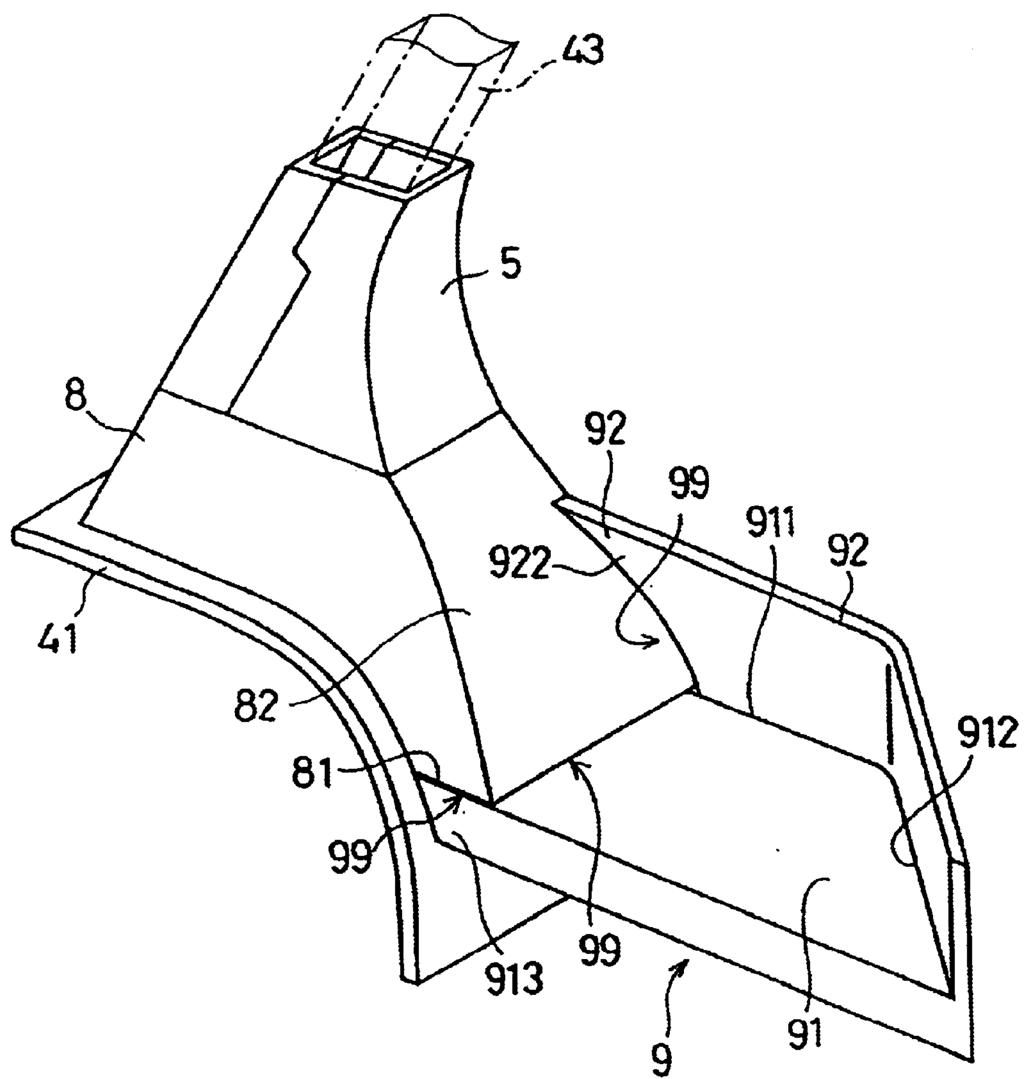
FIG. 6 is a perspective view showing a prior art step and a prior art fender cover.

A first embodiment of the present invention will now be described with reference to FIGS. 1 to 4. Same or like reference numerals are given to parts in FIGS. 1 to 4 that are the same as or like corresponding parts in FIG. 6.

Figure 2:
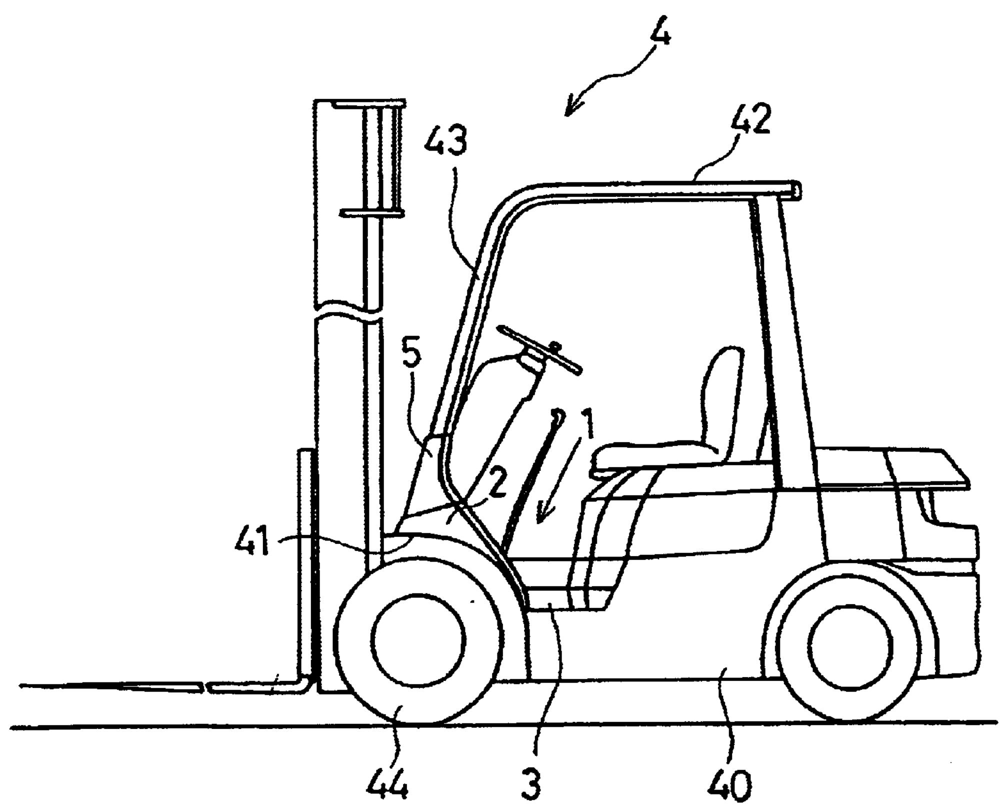
FIG. 2 is a side view showing a forklift having the fender cover and step of FIG. 1.
Figure 4:
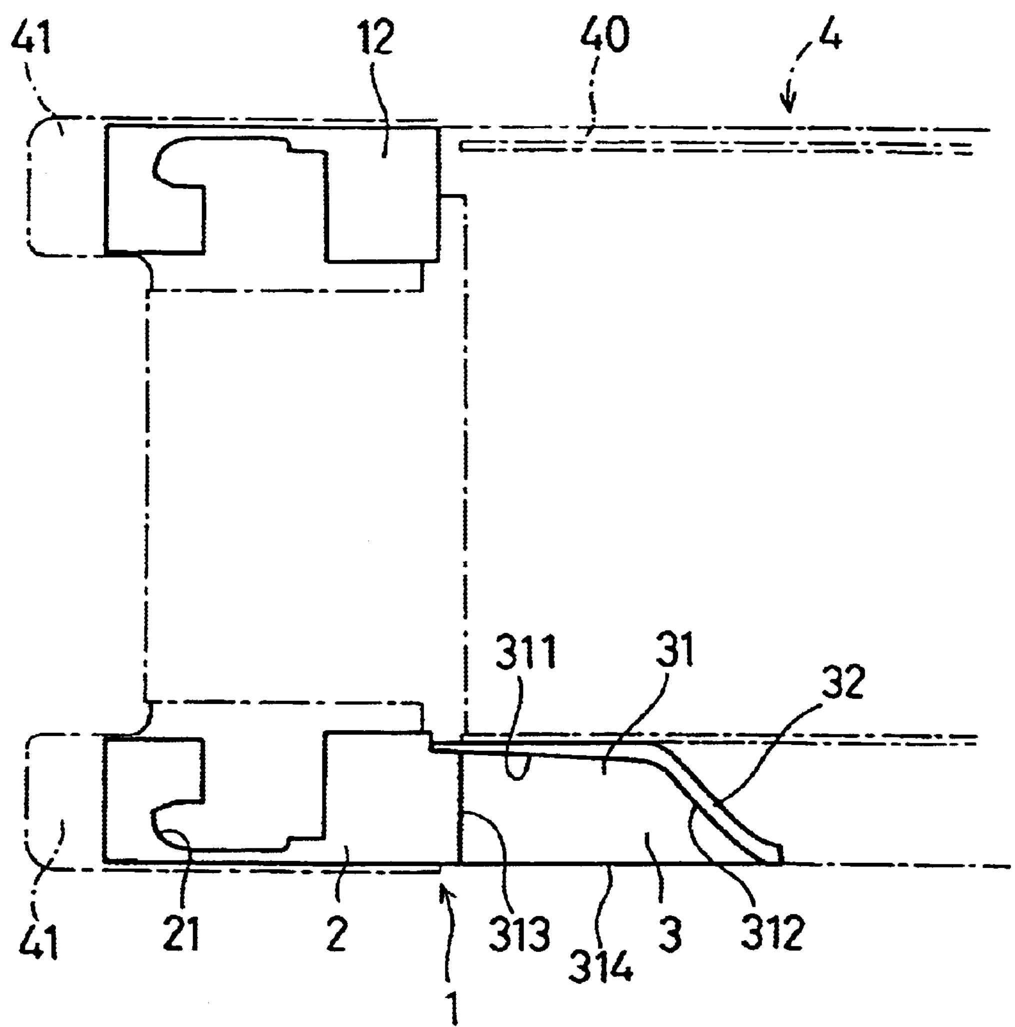
FIG. 4 is a plan view schematically showing a position at which the fender cover and step of FIG. 1 are installed in the forklift.

As shown in FIGS. 2 and 4, a forklift 4 has a pair of fenders 41. Each fender 41 extends above a corresponding front wheel 44. The fenders 41 are provided at opposite front sides of a body frame 40 of the forklift 4, as viewed in the proceeding direction of the forklift 4, at positions corresponding to the associated front wheels 44. A pair of pillars 43 extend upward from the associated fenders 41. The pillars 43 support a head guard 42 that extends above the operator seat of the forklift 4.

A fender cover 2 and a step 3 are provided at a left side of the body frame 40 in the proceeding direction of the forklift 4. The fender cover 2 and the step 3 are formed as one body through molding to form an integral body 1. The fender cover 2 is secured to top of the associated fender 41. The step 3 extends continuously from the fender cover 2 rearwardly in the forklift proceeding direction. As shown in FIG. 4, a fender cover 12 is provided at a right side of the body frame 40, or a side opposed to the fender cover 2. The fender cover 12 is shaped substantially as a mirror image of the fender cover 2 and is secured to the associated fender 41. No step is provided for the fender cover 12.

Figure 1:
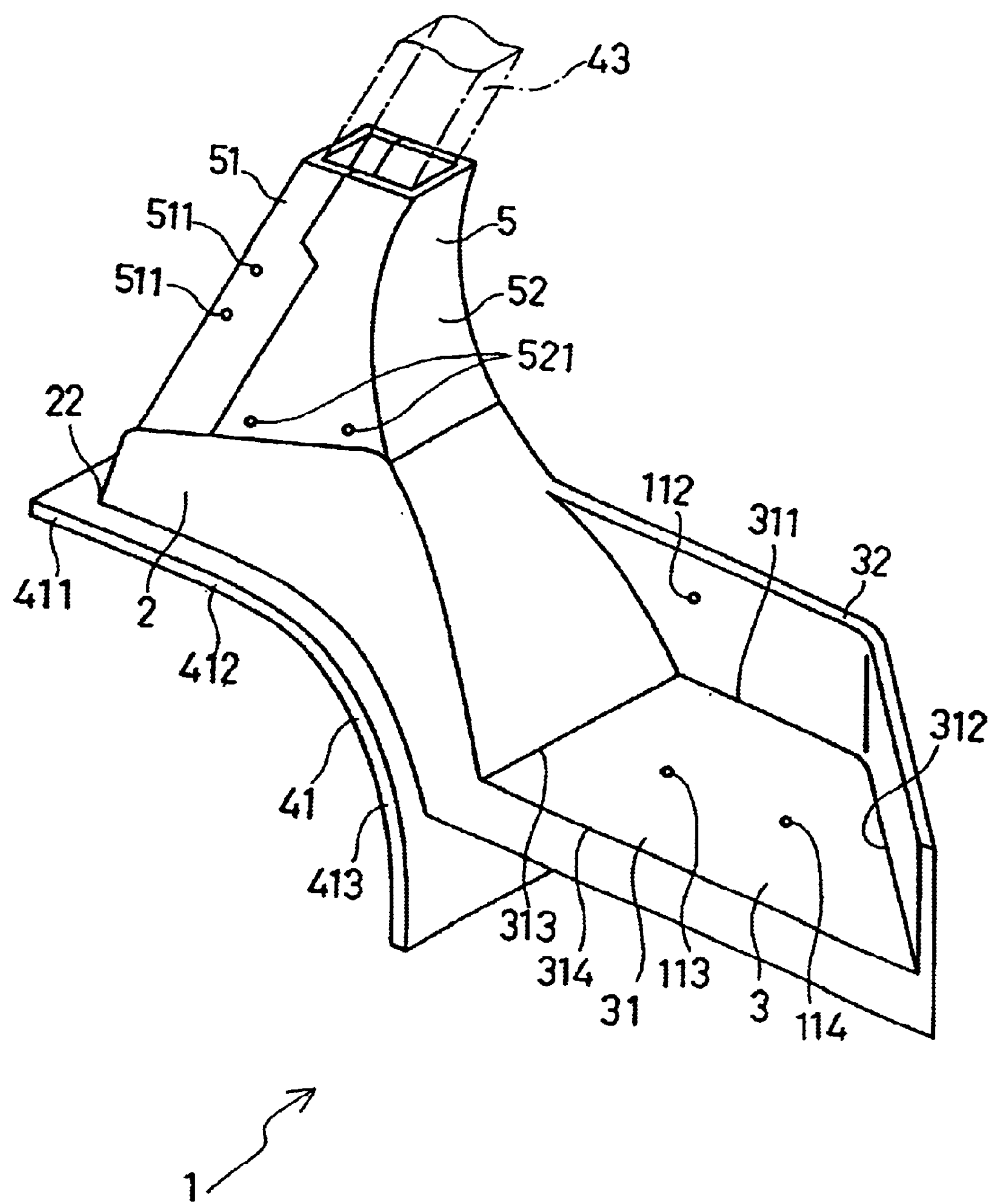
FIG. 1 is a perspective view showing a first embodiment of integrally molded fender cover and step according to the present invention.

The integral body 1 includes the fender cover 2 and the step 3 that are formed of resin and shaped as one body through molding. As shown in FIGS. 1 and 4, the step 3 has a floor panel 31 and a side wall 32 projecting upward from the floor panel 31. The side wall 32 extends along an inner edge 311 of the floor panel 31 located inward from the exterior of the forklift 4 and a rear edge 312 of the floor panel 31 located rearward in the forklift proceeding direction. The fender cover 2 extends diagonally upward from a front edge 313, of the floor panel 31 opposed to the rear edge 312. The front edge 313 of the floor panel 31 is connected integrally with the fender cover 2. In other words, the floor panel 31 is encompassed by the side wall 32 and the fender cover 2 along its inner edge 311, rear edge 312, and front edge 313. The floor panel 31 is thus open to the exterior of the forklift 4 along an outer edge 314 of the floor panel 31 opposed to the inner edge 311.

Figure 3A:
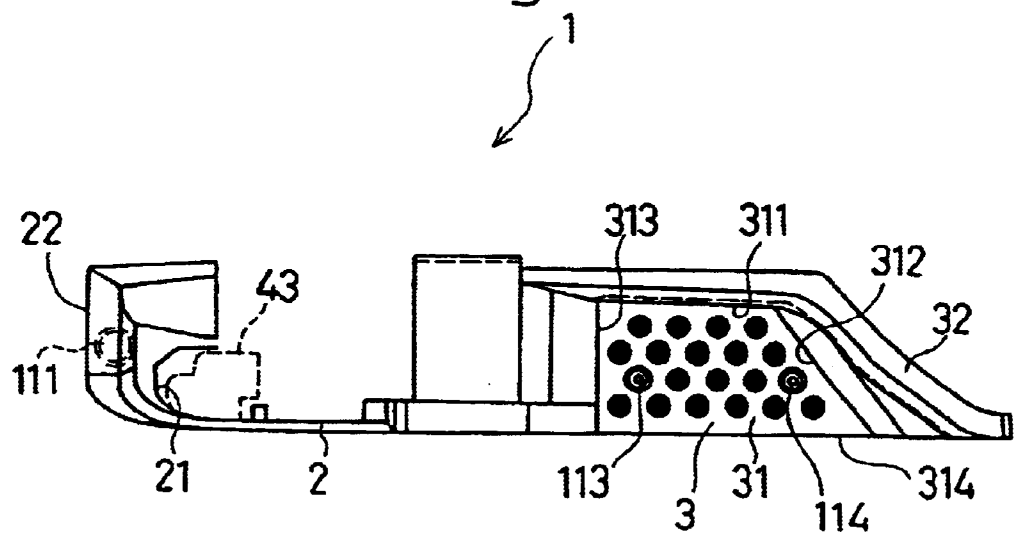
FIG. 3(*a*) is a plan view showing the fender cover and step of FIG. 1.
Figure 3B:
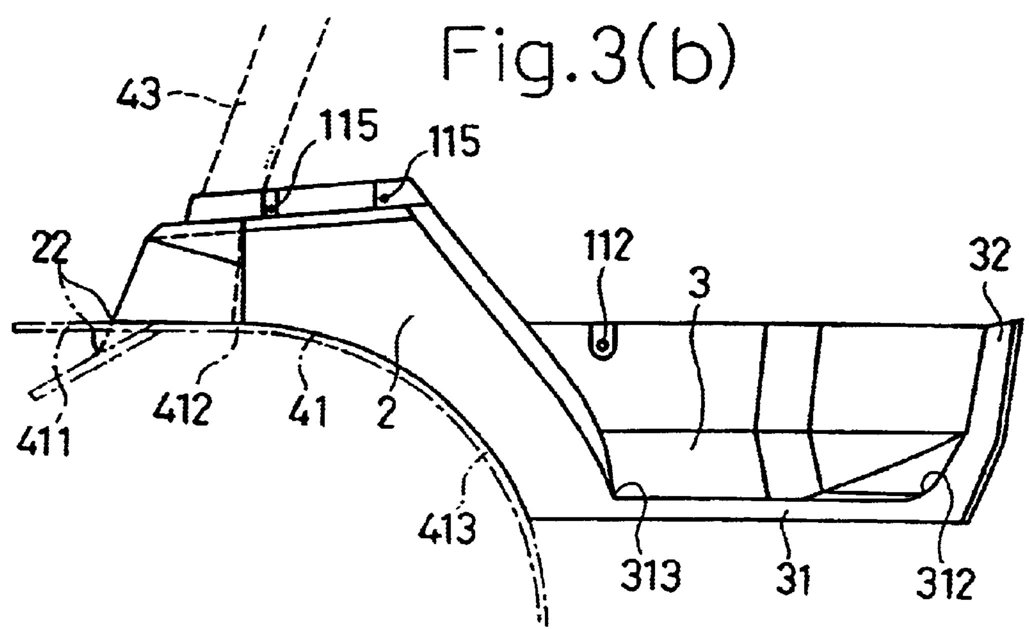

As shown in FIGS. 3(*a*) and 3(*b*), the fender cover 2 extends along the associated fender 41 and projects forward with respect to the associated pillar 43 in the forklift proceeding direction. As shown in FIG. 3(*a*), the fender cover 2 has a recess 21 through which the associated pillar 32 extends.

As indicated by the single dotted broken line in FIG. 3(*b*), the fender 41 includes a substantially horizontal, planar portion 411 and a substantially arched, curved portion 413. The curved portion 413 extends diagonally downward from a rear edge 412 of the planar portion 411 located rearward in the forklift proceeding direction. A front end 22 of the fender cover 2, as viewed to the left in FIG. 3(*b*), is located on the planar portion 411. That is, the front end 22 is located at the uppermost position of the fender 41.

As shown in FIG. 1, a pillar cover 5 extends upward from the fender cover 2 and encompasses the associated pillar 43. The pillar cover 5 includes a front section 51 and a rear section 52 located forward and rearward in the forklift proceeding direction, respectively. Although not illustrated, a pillar cover identical to the pillar cover 5 is secured to the fender cover 12 opposed to the fender cover 2.

A procedure for securing the integral body 1 to the body frame 40 of the forklift 4 will hereafter be described. First, the pillar 43 located to the left in the forklift proceeding direction is inserted through the recess 21 of the fender cover 2. The fender cover 2 is then positioned with respect to the associated fender 41, and the integral body 1 is placed on the body frame 40. In this state, the integral body 1 is fastened to the body frame 40 by means of a plurality of bolts 111, 112, 113, 114 (see FIGS. 1, 3(*a*), and 3(*b*)).

Next, the pillar cover 5 is coupled to the integral body 1. Specifically, the front section 51 and the rear section 52 are placed on the fender cover 2 such that the pillar 43 is encompassed by the front section 51 and the rear section 52. In this state, the front section 51 is fastened to the pillar 43 by means of a plurality of bolts 511 (see FIG. 1). Subsequently, the rear section 52 is fastened to the fender cover 2 and the body frame 40 by means of a plurality of bolts 521 (see FIG. 1). As shown in FIG. 3(*b*), a plurality of bolt holes 115 are formed in an upper section of the fender cover 2 for receiving the associated bolts 521.

As described above, the fender cover 2 and the step 3 are formed as one integral body 1 in the first embodiment. No coupling portion is thus formed between the fender cover 2 and the step 3. That is, no space is defined between the fender cover 2 and the step 3. Accordingly, no foreign objects such as rain water and dust enter a space defined below the step 3 within the body frame 40.

The floor panel 31 of the step 3 is encompassed by the side wall 32 and the fender cover 2 along its inner edge 311, rear edge 312, and a front edge 313. The step 3 is open to the exterior of the body frame 40 only along its outer edge 314. This structure prevents foreign objects from remaining on the floor panel 31 and enables the objects to fall from the outer edge 314 of the floor panel 31 to the exterior of the body frame 40.

Accordingly, the step 3 reliably prevents foreign objects from entering the space below the step 3 within the body frame 40. This allows electric devices such as motors and controllers to be accommodated in this space. The arranging of the parts forming the forklift 4 thus becomes simpler.

Since the fender cover 2 and the step 3 are provided as one integral body 1, the number of the parts used in the forklift 4 is reduced. Furthermore, it is unnecessary to align the fender cover 2 and the step 3 with respect to each other when installing them in the forklift 4. This decreases the number of the steps required for installing the fender cover 2 and the step 3, thus facilitating the installation. In addition, since no coupling portion is formed between the fender cover 2 and the step 3, the designing of the integral body 1 is simplified.

Since the integral body 1 is formed of resin, the fender cover 2 and the step 3 are shaped as desired. Furthermore, the integral body 1 is light and soft, thus facilitating installation of the same in the body frame 40.

The fender cover 2 extends along the associated fender 41 and projects forward with respect to the associated pillar 43. This structure prevents the rain water running along the pillar 43 from entering the space between the integral body 1 and the fender 41. The space below the step 3 within the body frame 40 is thus reliably sealed from rain water.

The front end 22 of the fender cover 2 is located at the uppermost position of the associated fender 41. This structure prevents rain water and the like retained on the fender 41 from entering the space between the fender 41 and the integral body 1. Accordingly, the space below the step 3 within the body frame 40 is further reliably sealed.

As indicated by the double dotted broken line in FIG. 3(*b*), the planar portion 411 may have a section extending diagonally downward from the remainder of the planar portion 411. In this case, it is preferred that the front end 22 of the fender cover 2 is located on a horizontal section of the planar portion 411 or the section extending downwardly from the horizontal section. This section is located forward from the remainder of the planar portion 411 in the forklift proceeding direction. In other words, it is preferred that the front end 22 of the fender cover 2 is located at the uppermost position of the associated fender 41 or at a position forward from this uppermost position in the forklift proceeding direction. This structure also reliably prevents rain water and the like from entering the space between the fender 41 and the integral body 1.

The fender cover 2 has the recess 21 through which the associated pillar 43 extends. The integral body 1 is thus easily secured to the associated fender 41 from which the pillar 43 projects.

Figure 5:
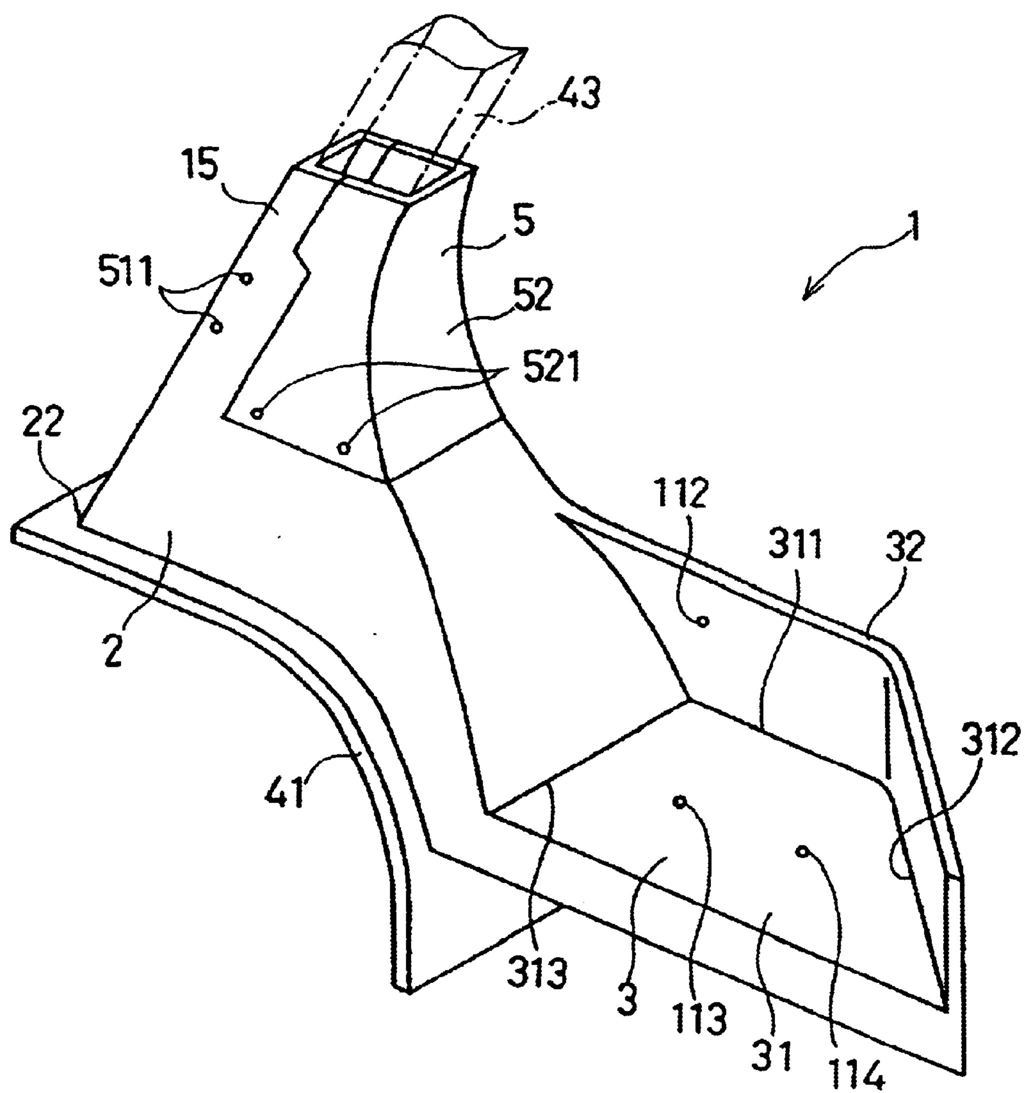
FIG. 5 is a perspective view showing a second embodiment of integrally molded fender cover and step according to the present invention.

FIG. 5 shows a second embodiment of the present invention. In the second embodiment, a portion of the pillar cover 5 corresponding to the front section 51 in FIG. 1 is formed integrally with the integral body 1. In other words, the integral body 1 includes a cover section 15 that forms part of the pillar cover 5, in addition to the fender cover 2 and the step 3. Like the first embodiment shown in FIGS. 1 to 4, the rear section 52 is provided along a corresponding section of the pillar 43.

Unlike the first embodiment in which the front section 51 is installed separately from the integral body 1, separate installation of the cover section 15 is unnecessary in the second embodiment. This simplifies installation of the pillar cover 5. Furthermore, no coupling portion is formed between the cover section 15 and the fender cover 2. Accordingly, as compared to the embodiment of FIGS. 1 to 4, the structure of the second embodiment further reliably prevents foreign objects from entering the space below the step 3.

Although the present invention is applied to the forklift 4 in the above embodiments, the present invention may be applied to other types of industrial vehicles.

The present examples and embodiments are to be considered as illustrative and not restrictive and the invention is not to be limited to the details given herein, but may be modified within the scope and equivalence of the appended claims.

What is claimed is:

1. A molded body used in an industrial vehicle, the vehicle including a body frame, a pair of fenders, a pair of pillars, each pillar extending upwardly from the associated fender, an operator seat, and a head guard, which extends above the operator seat and is supported by the pillars, the molded body comprising:

a fender cover mounted on one of the fenders, wherein the fender cover substantially covers the associated fender and a lower portion of the associated pillar;

a step located at a side of the body frame to extend rearwardly from the fender cover, the step being integrated with the fender cover, and the step forming an enclosed space below the step within the body frame, the space configured to accommodate an electric device; and a pillar cover that is located on the fender cover and covers one of the pillars, wherein the fender cover has an upper surface on which the pillar cover is mounted, and wherein the upper surface is inclined diagonally downwardly toward a front end of the fender cover.

2. The molded body according to claim 1, wherein the molded body is made of resin.

3. The molded body according to claim 1, wherein the step includes a floor panel and a side wall, the floor panel having an outer edge, an inner edge, a front edge and a rear edge, wherein the fender cover is integrated with the front edge, and the side wall is integrated with the inner edge and the rear edge, and wherein the floor panel is open to the side of the body frame through the outer edge.

4. The molded body according to claim 1, wherein the fender cover has a recess through which the associated pillar extends.

5. The molded body according to claim 1, wherein a front end of the fender cover is located at an uppermost position of the associated fender or at a position forward from the uppermost position.

6. The molded body according to claim 5, wherein the fender includes a substantially horizontal planar portion and a curved portion, wherein the curved portion extends diagonally downwardly from a rear end of the planar portion, and the front end of the fender cover is located on the planar portion.

7. The molded body according to claim 1, wherein each of the fenders includes a substantially horizontal section and an inclined section extending forwardly and diagonally downwardly from a front end of the horizontal section, wherein a front end of the fender cover is located on the inclined section of the associated fender.

8. The industrial vehicle according to claim 1, wherein the fender cover extends along the associated fender and projects forwardly with respect to the pillar cover.

9. An industrial vehicle comprising:

a body frame;

a pair of fenders connected to the body frame;

a pair of pillars, wherein each pillar is attached to the associated fender at its lower portion and extends upwardly from the associated fender;

an operator seat;

a head guard, which extends above the operator seat and is supported by the pillars;

a fender cover mounted on at least one of the fenders, wherein the fender cover covers the associated fender and the lower portion of the associated pillar;

a step located at a side of the body frame to be located rearwardly relative to the fender cover, wherein the step is integrated with the fender cover, and the step forms an enclosed space below the step within the body frame, the space configured to accommodate an electric device; and a pillar cover that is located on the fender cover and covers one of the pillars, wherein the fender cover has an upper surface on which the pillar cover is mounted, and wherein the upper surface is inclined diagonally downwardly toward a front end of the fender cover.

10. The industrial vehicle according to claim 9, wherein each of the fenders includes a substantially horizontal section and an inclined section extending forwardly and diagonally downwardly from a front end of the horizontal section, wherein a front end of the fender cover is located on the inclined section of the associated fender.

11. The industrial vehicle according to claim 9, wherein the fender cover extends along the associated fender and projects forwardly with respect to the pillar cover.

* * * * *